Figure 16:
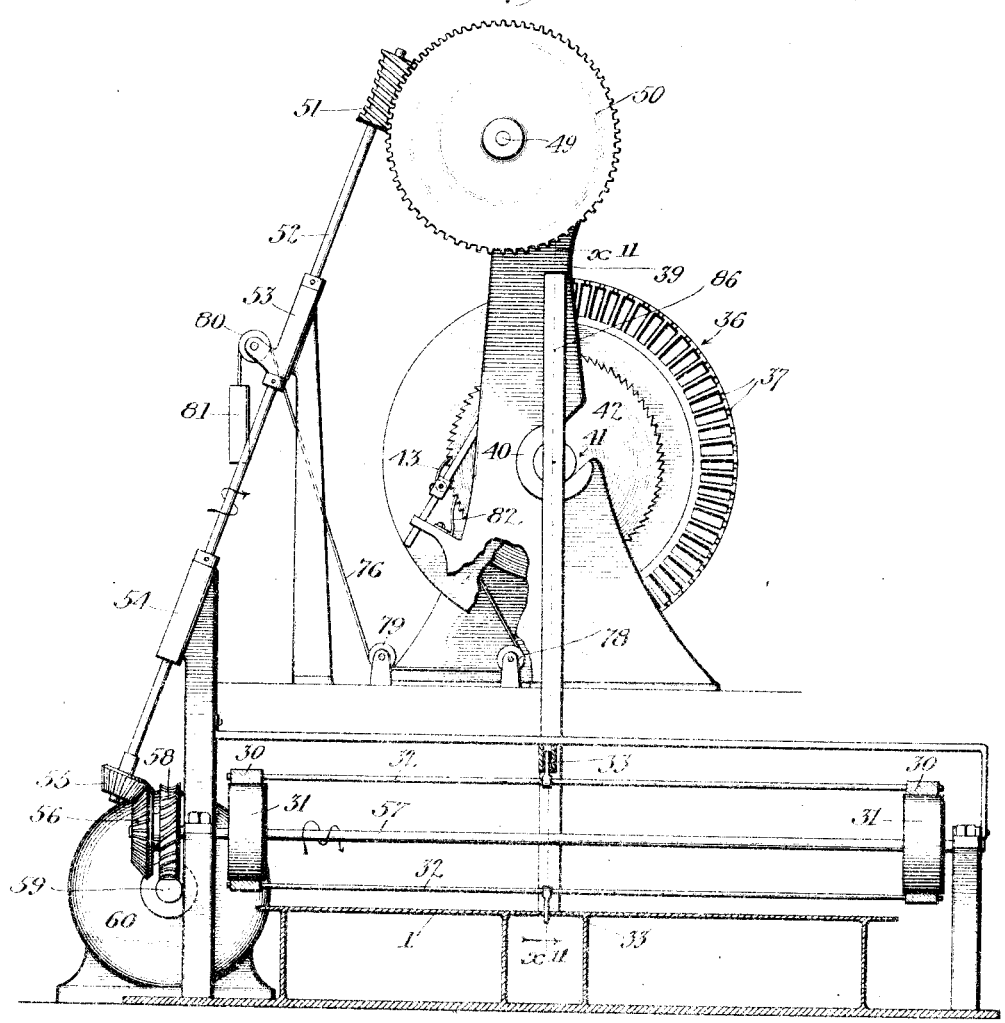

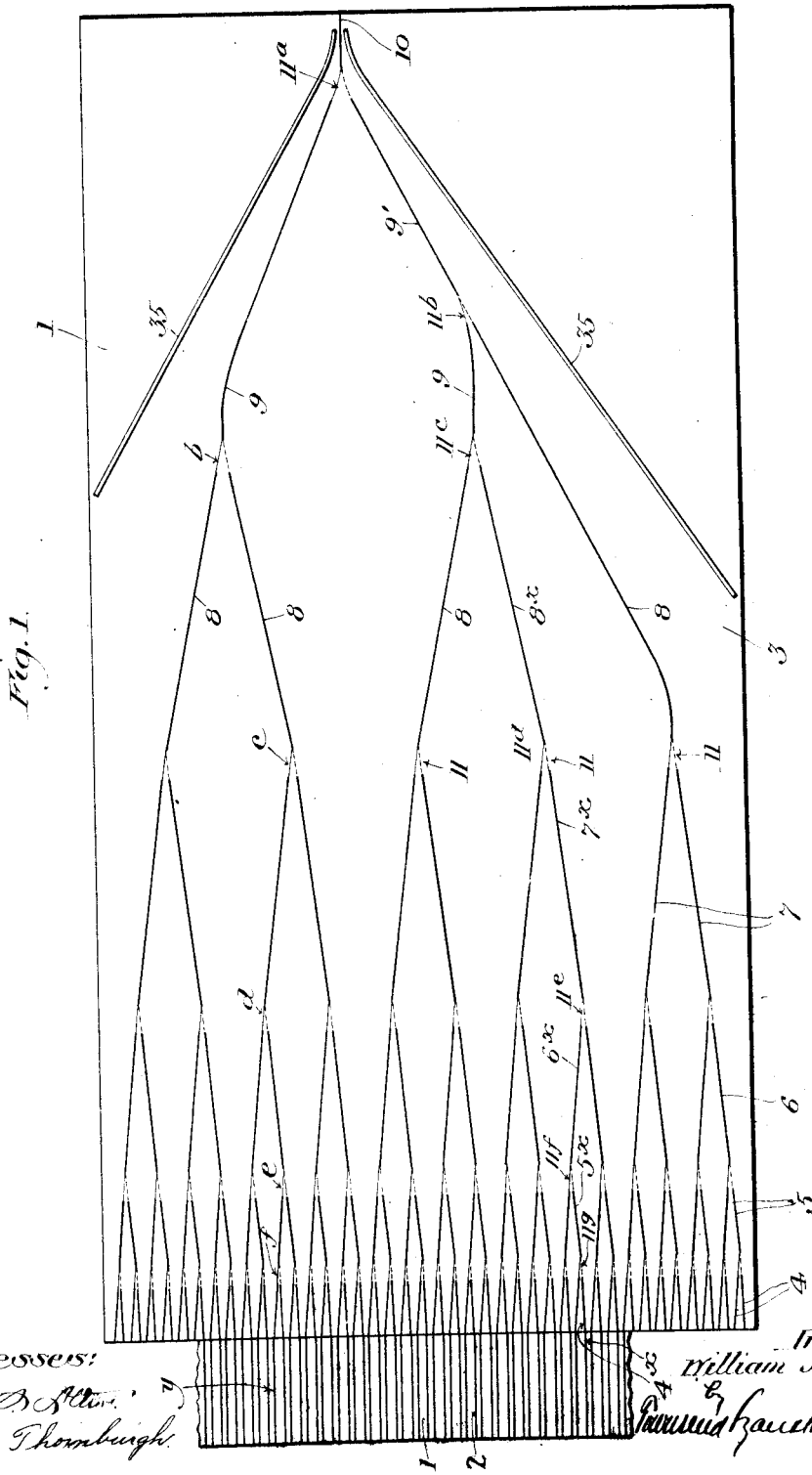

W. J. POOLE.
DISTRIBUTING MACHINE.
APPLICATION FILED MAR. 28, 1911.
1,075,724.
Patented Oct. 14, 1913.
7 SHEETS—SHEET 2.
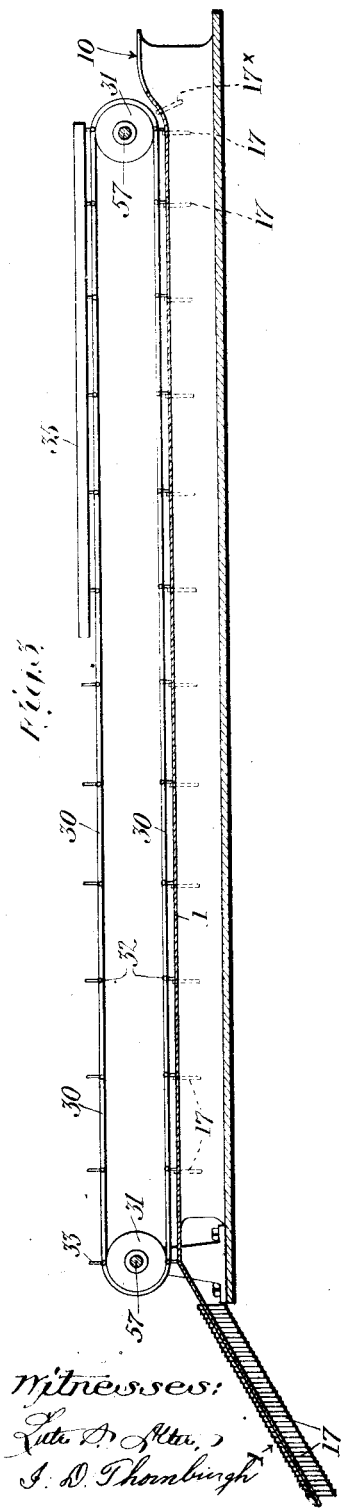
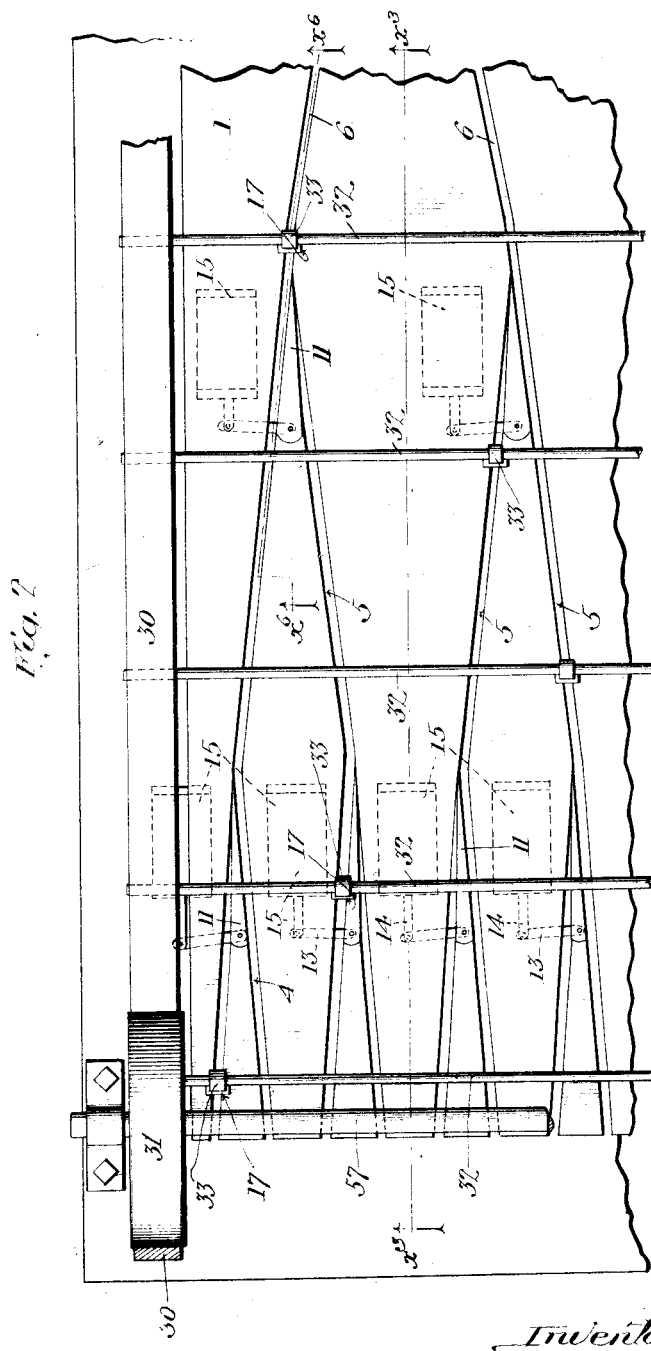
Witnesses:
Inventor,
William J. Poole, W. J. POOLE.
DISTRIBUTING MACHINE.
APPLICATION FILED MAR. 28, 1911.
1,075,724.
Patented Oct. 14, 1913.
7 SHEETS—SHEET 3.
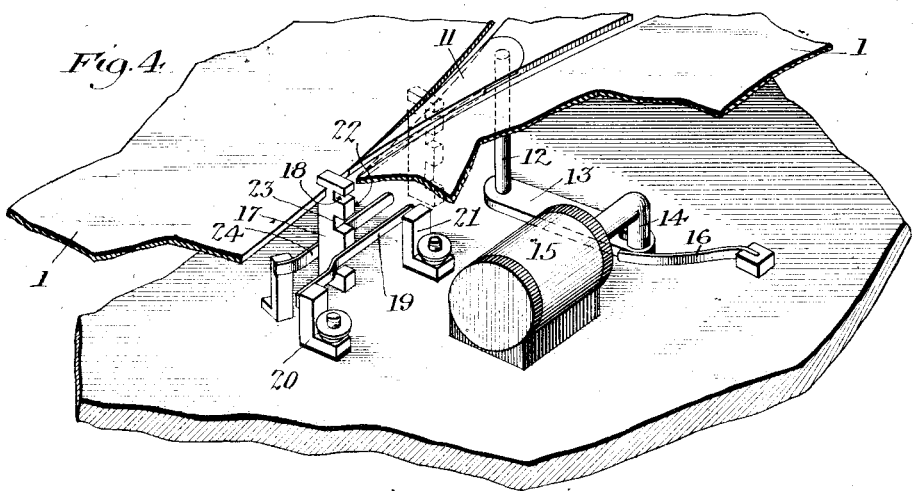
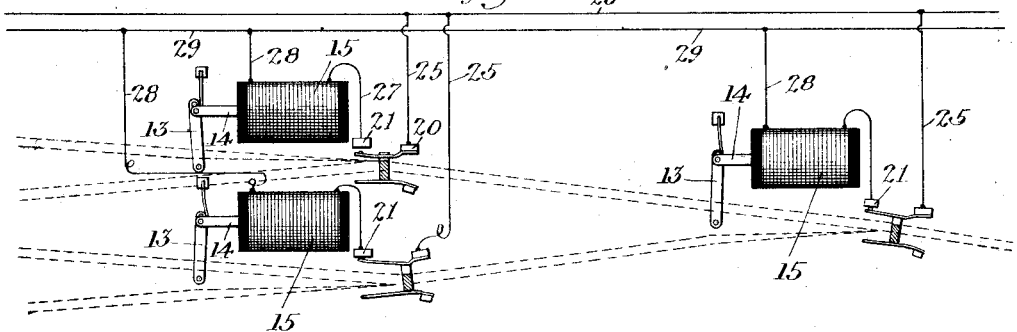
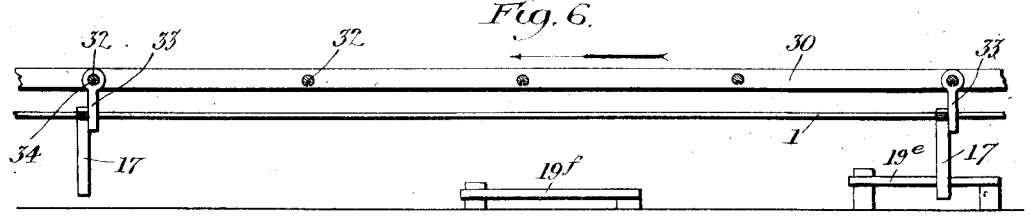
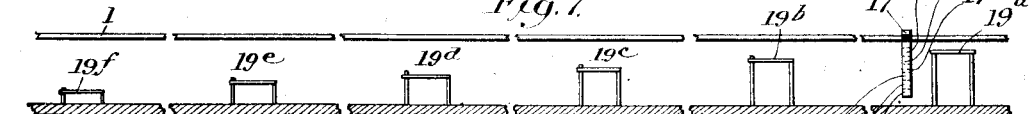
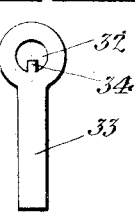
Witnesses:
Inventor:
William J. Poole

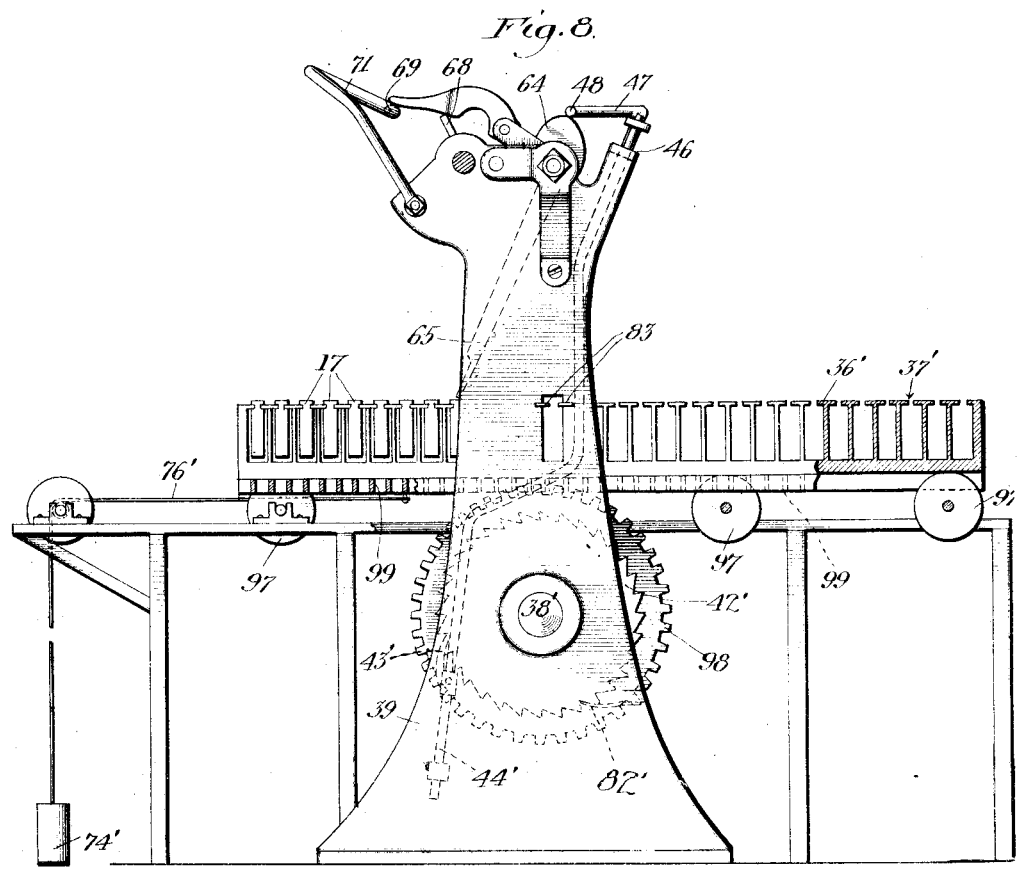

W. J. POOLE.
DISTRIBUTING MACHINE.
APPLICATION FILED MAR. 28, 1911.
1,075,724.
Patented Oct. 14, 1913.
7 SHEETS—SHEET 5.
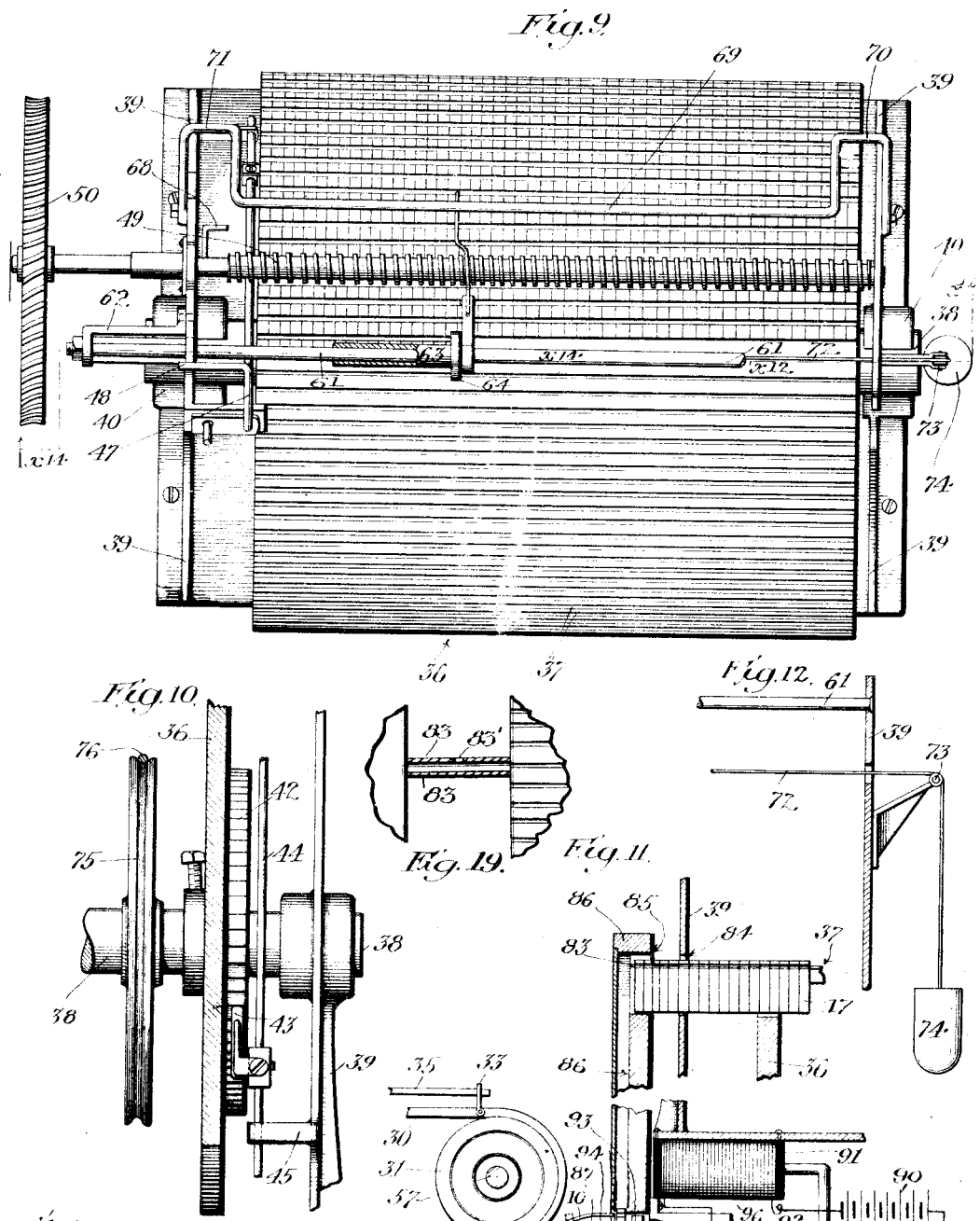

W. J. POOLE.
DISTRIBUTING MACHINE.
APPLICATION FILED MAR. 28, 1911.
1,075,724.
Patented Oct. 14, 1913.
7 SHEETS—SHEET 6.
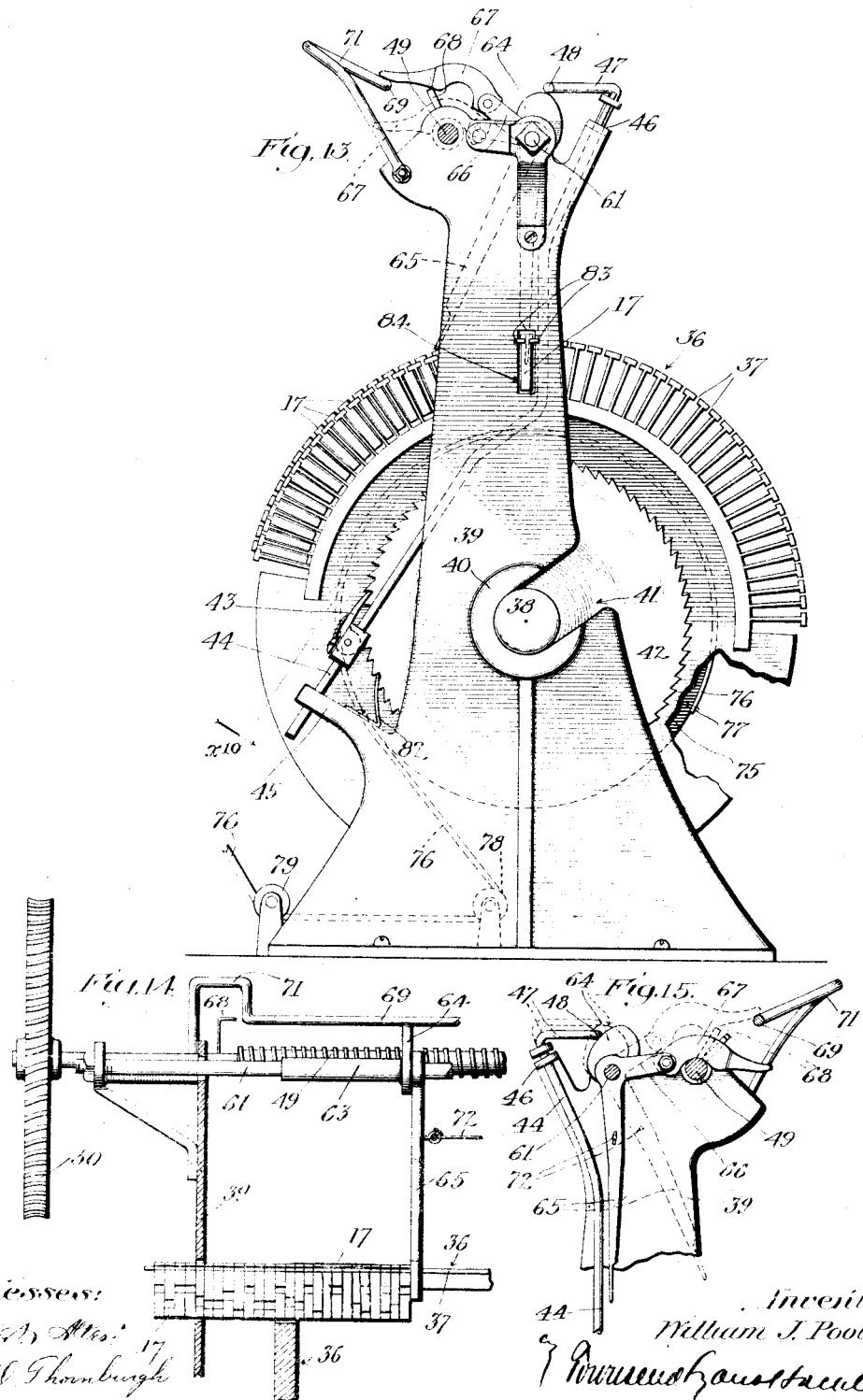

UNITED STATES PATENT OFFICE.

WILLIAM J. POOLE, OF LOS ANGELES, CALIFORNIA.

DISTRIBUTING-MACHINE.

1,075,724.   Specification of Letters Patent.   Patented Oct. 14, 1913.

Application filed March 28, 1911. Serial No. 617,482.

*To all whom it may concern:*

Be it known that I, WILLIAM J. POOLE, a citizen of the United States, residing at Los Angeles, in the county of Los Angeles and State of California, have invented a new and useful Distributing-Machine, of which the following is a specification.

This invention relates to a machine for distributing type from a type holder to a magazine.

In a companion case of mine, filed March 28th, 1911 Serial No. 617,481, I have shown and described a type composing machine wherein, by the operation of key mechanism, type which are in a magazine are delivered to a type holder.

The main object of the present invention is to provide a machine for automatically distributing the type into the magazine directly from the type holder.

Another important object of the present invention is to provide means whereby each type automatically selects its own path of travel and is thereby properly conducted to its position in the magazine.

Another object is to automatically move the type out of the type holder.

Another object is to automatically move the type holder to bring the rows of type successively into discharging position.

Other objects and advantages will appear from the following description.

Referring to the drawings: Figure 1 is a diagrammatical plan view of the system of type tracks. Fig. 2 is a plan view of a portion of the system of type tracks showing the type moving mechanism. Fig. 3 is a vertical section on line $x^3$—$x^3$ in Fig. 2 on a reduced scale. Fig. 4 is a perspective view of a portion of the track plate at a switch, showing the mechanism which coöperates automatically with the type for controlling the switch. Fig. 5 is a diagrammatical view showing the electrical connections for controlling the switches. Fig. 6 is a section on line $x^6$—$x^6$ Fig. 2. Fig. 7 is a diagrammatical view graphically illustrating the different elevations of the contact blades with respect to the traveling type. Fig. 8 is an end elevation of the flat form of type holder. Fig. 9 is a plan view of the rotary form of type holder. Fig. 10 is a section on line $x^{10}$—$x^{10}$ Fig. 13. Fig. 11 is a section on line $x^{11}$—$x^{11}$ Fig. 16. Fig. 12 is a section on line $x^{12}$—$x^{12}$ Fig. 9. Fig. 13 is an end elevation of the cylindrical form of the type holder. Fig. 14 is a section on line $x^{14}$—$x^{14}$ Fig. 9. Fig. 15 is a view looking at the reverse side of the upper end of the stand shown in Fig. 13. Fig. 16 is an end view of the distributing machine. Fig. 17 is a front elevation in detail of a type pushing finger. Fig. 18 is a diagrammatical side elevation of the complete machine. Fig. 19 is a plan view of a portion of the rotary type holder, showing the supporting tracks for conducting type from the holder to the vertical chute.

The invention is especially applicable for use in distributing type from a printing machine such for example as the multigraph. The type used generally resemble typewriter type and the different characters will usually range in number from eighty to ninety, although it should be understood that the invention is not restricted to this kind of printing machine or to this number or kind of type.

The type which are to be distributed are in a holder in which they have been held while in the printing machine, and this holder with the type is removed from the printing machine and placed in the machine forming the present invention. This type holder in which the type are held and from which they are to be distributed is preferably of a flat form, although it may be constructed in a cylindrical form, as will be hereinafter set forth.

The holder containing the type having been placed in the distributing machine, and the distributing machine started in operation, mechanism then operates to slide a line of type out along its groove in the type holder and push one type at a time out of the holder and deliver it to a separator mechanism, and the type are caused to progress through the separator mechanism, and devices therein operate to direct the various type along various paths of travel, whereby each type ultimately arrives at its proper destination. As the type progress through the separating mechanism, other type are being removed from the type holder and delivered to the separator mechanism, and as each row of type is removed from the holder, the holder is automatically caused to move in a direction to bring another line of type into discharging position and to also cause the type moving mechanism to automatically return to its starting point so that the second line of type commences to be discharged immediately after the preceding row has been discharged, so that there is no interruption in the continuity of the distributing mechanism. From this it will be seen that the act of distribution commences with the discharging movement of the type from its position in the type holder, the distribution being direct from the holder through the distributing machine into the magazine.

The machine is operated preferably by an electric motor and all of the parts caused to act in harmonious relation so that the type as they are removed from the holder are placed in the separating machine with a proper interval between each type, thereby causing the type to be spaced apart somewhat in the separating machine which affords time for the separating devices to act and properly divert each type to its proper track.

While I have shown two forms of mechanism for removing the type from the holder, one being the flat form and the other the cylindrical form, I have shown one form of separating mechanism.

The type which are to be distributed by the machine are to be delivered into a magazine 1, with a series of parallel type holding means, such as slots 2, in which the type are adapted to be slidably received. In Fig. 1 the view is diagrammatical, the scale being so small that the type are not shown. In one of the slots 2, type bearing the letter "e" would be arranged and in another slot type bearing the letter "a" would be arranged and so forth.

3 designates a track plate which at one end is arranged with a series of type tracks 4, which tracks are preferably slots and the discharge ends of which register with the receiving ends of the slots 2, there being one track 4 for each slot 2. The tracks 4 are arranged in pairs, as shown, the two tracks of each pair converging and joining tracks 5. The tracks 5 are likewise arranged in pairs, each two tracks of a pair converging to unite with a track 6. The tracks 6 are also in pairs, each two tracks of a pair converging to unite with a track 7. The tracks 7 are in pairs, each two tracks converging to unite with a track 8. In Fig. 1, I have shown five tracks 8, four of which unite with tracks 9 and the fifth uniting with one of the tracks 9', the two tracks 9 uniting with a single track 10. Note that in Fig. 1, I have shown an extra switch 11ᵇ which according to its location between the switches 11ᵃ and 11ᶜ gives the extra sixteen tracks 4 at the right which are sufficient for the purpose. A type is received at first on the track 10 and is conducted along a path which will carry it ultimately to one of the tracks 4 from which it will be delivered to its slot 2. At the junction between the different groups of tracks are switches 11.

The full lines in Fig. 1 do not represent switch tongues but indicate that the switch stands so that the type will not pass therealong, the passage of the type being along the dotted line, thus normally, a type will always pass along the dotted line onto the branch track at the right in Fig. 1, looking at Fig. 1 with the magazine at the bottom, unless the switch tongue is shifted. This will also be understood from Fig. 2, wherein the solenoid 15 at the extreme left is shown with its armature extended and the associated switch tongues 11 lying in normal position, leaving the right hand branch track 4 open so that a type will pass therealong. I provide for the automatical operation of a solenoid, and its switch tongue when a type approaches a switch, so that the switch will either be automatically operated, or caused to remain in normal position, in order to guide the type to the proper branch of type track, so that the type will ultimately be delivered to its proper slot.

I prefer to electrically operate the switches, and referring to Figs. 4 and 5, each switch 11 is shown as mounted on a post 12, the lower end of which has an arm 13 which is pivotally connected to a sliding armature 14 of a solenoid 15. 16 is a spring which normally holds the armature 14 extended with the switch 11 in the position shown in dotted lines in Fig. 4. Whenever the solenoid 15 is energized, it attracts its armature 14 and swings the switch 11 into position shown in full lines in Fig. 4 and the switch remains in this position until the solenoid is deënergized. 17 designates the type, the upper ends having a pair of oppositely arranged notches 18 which slide in the edges of the slots in the track plate 1 and in front of each switch 11 is a spring contact 19, one end of which is secured to a post 20 and its other end is adapted to be moved into contact with a post 21, thereby closing circuit through the associated solenoid 15. The contact arm 19 is moved against the post 21 by the switch controlling face of the type, which is provided with projections 22 and depressions 23 in the type, as shown, although in one type there will be no depressions and in another type there will be no projections, while the other type will each have a varying number of depressions and projections. By referring to Fig. 1, it will be seen that with the eighty receiving slots there are only six or seven switches to be passed by a type and therefore a type will require but six or seven depressions or projections, as the case may be. Thus if a certain type is to always keep to the left in passing along it must throw each switch which it encounters to open the lefthand track, and that type will thus be a straight type with no depressions which will make electrical connection between contacts 19 and 21 at each switch which it encounters. The contact blades 19 are arranged at various elevations, as indicated in Fig. 7, so that a different portion of the switch operating face of the type will be operative for each switch; thus, in Fig. 7, the type 17 is shown as divided into six divisions by the dotted lines on the type. Thus, in Fig. 7, the type 17 in passing the contact blade 19$^a$ will bring its upper division 17$^a$ in line therewith; in passing the contact blade 19$^b$ it will bring its division 17$^b$ in line therewith; in passing the contact blade 19$^c$ it will bring its division 17$^c$ in line therewith; in passing the contact blade 19$^d$ it will bring its division 17$^d$ in line therewith; in passing the contact blade 19$^e$ it will bring its division 17$^e$ in line therewith; and in passing the contact blade 19$^f$ it will bring its division 17$^f$ in line therewith.

If the division face of the type is a projection, it will bear against the contact blade 19 and move the same into connection with post 21; while, if the division is a recess, it will not move the contact blade 19 into connection with post 21. A guide rod 24 is employed on the opposite side of the type for supporting the same and causing the type to bear firmly against the contact 19 when the latter is engaged by a projecting division of the type, so that firm contact of the blade 19 with post 21 is assured.

A type in traveling from the beginning of its course to the end will encounter, for example, six switches and as each switch controls two branches, it is obvious that a large number of type may be distributed by this system and with but a very few divisions on the selecting face of the type and it should be understood that in the present case I have utilized only one side of the type for controlling the switches. Suppose a type is to be delivered into slot $y$, see Fig. 1. Upon reaching switch 11$^a$ the upper division 17$^a$ of the type would be a projection which would close the contact 19$^a$, energize the solenoid 15 and swing the switch tongue 11 to close the right-hand track, and open the left-hand track, thereby causing the type to travel down the left-hand track 9 until it reaches switch $b$ at which point the next division 17$^b$ of the type which is a depression, will not close contact 19$^b$, and the switch tongue will therefore not be shifted and the type will thus pass down the right-hand branch 8. Upon arriving at switch $c$ the next division 17$^c$ of the type will be a projection which will close contact 19$^c$ and throw the switch tongue to open the left-hand track, so that the type will pass down the left-hand branch. Upon arriving at the switch $d$ the next division 17$^d$ will be a depression which will not close contact 19$^d$, the switch will not be operated and the type will pass down the track to the right; and upon arriving at the switch $e$, the division 17$^e$ of the type will be a projection which will operate the switch and cause the type to pass onto the left-hand track; and upon arriving at the switch $f$, the division 17$^f$ of the type will be a projection which will close contact 19$^f$, throw the switch and cause the type to pass onto the left-hand track and thus arrive at the slot $y$. From this it will be seen that with the six divisions it is possible to cause a large number of different type to be delivered to their respective slots.

Fig. 5 shows how the solenoids are disposed with relation to the tracks, dotted lines indicating the tracks, the respective posts 20 being connected by wires 25 with a common wire 26, post 21 being connected by wires 27 with one pole of the associated solenoid and the other pole of each solenoid being connected by a wire 28 with a wire 29.

In order to move the type along the tracks, I provide a carrier which consists of a pair of belts 30 which are located on opposite sides of the track plate 1, each belt passing over pulleys 31 and secured to the belts 30 at intervals and extending laterally across the track plate 1 are cross rods 32, each cross rod 32 being slotted, as clearly shown in Fig. 6, and slidable on each rod 32 is a finger 33 which has a lug 34 projecting into the slot in the rod 32, so that the finger 33 is prevented from turning on the rod 32, the rods 32 being held from turning by the belts 30. As shown in Figs. 2 and 6, the fingers 33 project down through the slots in the track plate 1 and each finger 33 is adapted to lie behind a type 17 and push the type along as the belts 30 travel. The object of making the fingers 33 slidable on the rods 32 is to permit the necessary lateral movement of the fingers 33 which they must have to follow the various angles of the tracks along which they must ride. As the finger projects into the slot, the slot will act to automatically guide the finger and shift the finger along the rod 32 as the finger moves along. As the fingers 33 arrive at the discharging terminals of the tracks, the various fingers will have been spread apart and it is necessary that they should be restored to a central position on their respective rods 32 before they can again enter the single receiving slot at the receiving end of the track plate and to accomplish this I provide two converging rails 35, as shown in Figs. 1 and 3, which act to guide the respective fingers 33 to a central point as they pass through the upper part of their travel in returning to the receiving end of the track plate, so that when they arrive at the receiving end they will consecutively enter the single slot 10.

The type are automatically transferred from the type holder to the track plate, the several lines of type in the type holder being removed therefrom one after the other without requiring any attention upon the part of the operator.

The type holder comprises, in one form, a cylinder 36 which is provided with parallel slots 37, each slot being adapted to hold a line of type, the notches 18 of the type engaging the walls of the slot. The cylinder 36 is mounted on a shaft 38 and standards 39 are formed with bearings 40 having slots 41 to detachably receive the shaft 38 and permit the cylinder to be easily inserted or removed from the bearings. On the shaft 38 is a ratchet wheel 42 which is engaged by a pawl 43 carried by a rod 44, the lower end of which is slidable in a lug 45 and the upper end of the rod 44 is slidable in a lug 46 projecting from the upper end of the standard 39. The rod 44 has an offset portion 47 which carries an arm 48.

49 is a screw journaled in the upper ends of the standards 39 and has a worm wheel 50 on its end which is driven by a worm 51 carried by a shaft 52 mounted in journals 53 and 54 and having a bevel gear 55 on its lower end which meshes with a bevel gear 56 on a shaft 57, the latter having a worm wheel 58 driven by a worm 59 operated by a motor 60. Two of the pulleys 31, before referred to, are mounted on the shaft 57.

The flat form of holder is shown in Fig. 8, and differs but slightly from the cylindrical form, having a flat holder 36′ with slots 37′ in which the type 17 are held. The finger 65 as in the cylindrical form is adapted to operate through the slots 37′, but when moved into dotted line position, as shown in Fig. 8, it escapes the slots, as shown, to permit the carriage to be returned to its starting point.

The holder 36′ is mounted to travel on rollers 97 and is retarded in its movement by a cable 76′ which carries a weight 74′. The holder 36′ is propelled by a gear 98 which meshes with a rack 99 formed on the holder 36′. The gear 98 is mounted on shaft 38′ driven by a ratchet 42′, the ratchet 42′ being operated by a rod 44′ and pawl 43′ and other operating elements which are the same as in the preceding form.

The weight 74′ and connections 76′ exert a constant rearward pull on the holder 36′ causing the ratchet 42′ to bear firmly against its retaining pawl 82′. A rod 61 is mounted above the holder 36′ parallel with the screw 49, one end being supported by a bracket 62, as shown in Fig. 9, and its other end being supported in the right-hand standard 39, as shown in Fig. 12. In Fig. 9, the right-hand portion of rod 61 has been broken away to show underlying features. Slidable on the rod 61 is a sleeve 63, on one end of which is formed a cam 64, as clearly shown in Figs. 14 and 15, and also formed on the sleeve 63 is a type pushing arm 65, the lower end of which is thin and adapted to extend through a slot 37 of the type holder 36. Extending from the upper end of the arm 65 is an arm 66 on the end of which is adjustably secured a lever 67 which is adapted to engage a screw 49. The adjustment of lever 67 permits perfect engagement with the screw. Projecting from the screw 49 is a crank 68 which rotates with the screw and when the lever 67 is carried by the screw into a position over the crank 68, the latter will engage underneath the lever 67 and swing the lever 67 together with arm 65 and cam 64 into the position shown in dotted lines in Fig. 15. As this does not occur until the lever 67 is over the crank 68 and as the latter is beyond the end of the holder 36, the arm 65 will by that time have passed beyond the end of the holder and is therefore free from the slot in the holder, so that the arm 65 is free to swing into position shown and when in such position its angle is sufficient to enable it to clear the face of the holder and permit it, together with lever 67, cam 64 and sleeve 63, to be moved back to the starting end of the holder, right-hand end of the holder, Fig. 9 and right-hand end of flat holder Fig. 8.

Arranged parallel with the screw 49 is a supporting rod 69, at the ends of which are loops 70 and 71. The rod 69 is positioned close enough to the screw 49 to support the end of the lever 67 during the backward travel of the same and thereby hold the parts in dotted line position shown in Fig. 15 during the time that they travel to the starting end of the holder. The loop 71 permits the upward movement of the arm 67 when operated by the crank 68. A flexible connection 72 is secured to the arm 65, (see Figs. 14 and 15), and extends over a pulley 73, (see Figs. 9 and 12), and is attached to a weight 74 which exerts a constant pull on the arm 65 and its attached parts tending to draw them toward the starting end of the holder, so that immediately upon the lever 67 and attached parts being tilted into the dotted line position shown in Fig. 15 and thus released from the screw, they will be drawn by the weight toward the starting end of the holder, the end of the lever 67 during this movement riding on the top of the supporting rod 69 and as soon as the lever 67 reaches the loop 70, the latter is allowed to fall and, together with its attached parts, thereupon falls back by gravity into normal position, as indicated in full lines in Fig. 15, which allows the lever 67 to reëngage the screw 49, whereupon the rotation of the screw again pulls the carriage forward and the arm 65 pushes along the type in the next slot.

At the time the lever 67 and attached parts are operated by the crank 68 into the dotted line position, as shown in Fig. 15, the cam 64 acting upon the arm 48 raises the rod 44, thereby causing the pawl 43 to actuate the ratchet 42 to bring another slot with its type into position at the top, so that when the arm 65 has been restored to the starting point of the holder and has commenced its forward travel it will encounter a line of type in the succeeding slot which it will push out of the slot as it progresses toward the discharge end of the holder.

In order to insure the holder 36 being turned or holder 36' being advanced the exact distance, in case of holder 36 a sheave 75 is attached to shaft 38, (see Figs. 10 and 13), and a flexible connection 76 is secured to the sheave by a pin 77, as shown in Fig. 13, and passing under pulleys 78 and 79 and over a pulley 80 supports a weight 81 which exerts a constant pull on the holder 36 tending to turn the same counter-clockwise in Fig. 16. A retaining pawl 82 is provided which holds the ratchet and holder from rearward movement. Thus, if the pawl 43 should happen to advance holder 36 and turn the holder 36 a trifle too far, the weight 81 would act to retract the holder the excess amount until the ratchet was arrested by the retaining pawl 82. This insures the accurate advancing of holder 36' and accurate turning of the holder 36, there being one tooth in the ratchet provided for each slot in the holder. When the holder is to be removed from the standards 39 of the distributing machine, the connection 76 may be detached from the sheave 75 by withdrawing the pin 77. This permits the holder to be placed in the composing machine, as shown in the companion application of mine before referred to, to receive the type preparatory to being placed in the printing machine. After the holder has been operated in the printing machine and it is desired to distribute the type, the holder with its type is removed from the printing machine and placed in the distributing machine and the flexible connection 76 is attached by pin 77. Thus the type in a slot are pushed out one by one by the forward motion of the finger 65 and a type upon issuing from the end of the slot is immediately received by a pair of tracks 83, the ends of which tracks are shown in Fig. 13. In Fig. 11, the outer end of one of the tracks 83 may be seen, but the nearest track is removed in this figure, which is a sectional view. One of the tracks 83 has a transverse opening 83' which permits the arm 65 to swing laterally when moving into alinement with the next slot, as previously described. This opening is in one of the tracks only and does not allow the type to fall when passing that point, as the other track will sustain the type. The tracks 83 receive the notches 18 of the type and carry the type from the end of the holder through a slot 84 in the standard 39 and carry the type beyond the slot 84 through a slot 85 into a vertical chute 86 down which chute each type falls in turn and at the bottom strikes a pivoted weighted lever 87, causing the latter to make connection with an electrical contact 88, thus closing a circuit through wire 89, battery 90, solenoid 91, which thereupon moves its armature 92 to the left and a plunger 93 on the end of the armature expels the type through a slot 94 at the lower end of the chute 86, the notches 18 of the type in passing through the slot 94 being received by the walls of the slot 10, before referred to, see Figs. 3 and 11, and the type passes down the slot 10, as indicated in dotted lines Fig. 11, and is carried along onto the track plate 1 by a finger 33. When the type is discharged from the lever 87, the latter being weighted swings up and breaks connections with contact 88, thereby breaking circuit through solenoid 91, whereupon a spring 95 forces back the armature 92 and plunger 93. Wire 96 connects the pivot of lever 87 with the other pole of solenoid 91.

What I claim is:—

1. A slotted type holder for holding lines of type in the respective slots, a series of destination tracks for receiving the respective characters of type, means for guiding type from said type holding means to the respective destination tracks, means for causing type to move off from the type holder to said guiding means, means for positively moving type simultaneously along in a plurality of said type guiding means, and means for moving the type holder bodily laterally of said guiding means to bring rows of type successively into register with said guiding means.

2. A type holder for holding lines of type, a series of destination tracks for the respective characters of type, a single track for receiving type from the type holder, a plurality of tracks branching from the single track to the first named tracks, and switch means at each junction controlled by each type independently of the switch means at the other junctions for guiding the type onto a definite track at each junction of branch tracks, whereby each type is guided to its proper destination.

3. A type holder for holding lines of type, a single track for receiving type from the type holder, tracks branching from the single receiving track to form a series of tracks for the respective characters of type, switches at the junctions of the tracks, and means controlled by each type slightly in advance of each switch for causing said switch to occupy a definite position independently of the position of the other switches before the type reaches said switch and thereby cause the type to travel a definite path to its destination.

4. A slotted type holder for holding lines of type in the respective slots, a single track for receiving type from the type holder, tracks branching from the single receiving track to form a series of tracks for the respective characters of type, means for positively moving type along simultaneously in a plurality of said tracks, switches at the junctions of the tracks, means controlled by each type slightly in advance of each switch for causing said switch to occupy a definite position before the type reaches it and thereby cause the type to travel a definite path to its destination, means for pushing each line of type from the type holder, and means for moving the type holder bodily to bring the lines of type therein successively into register with said single receiving track.

5. A single receiving track, a series of destination tracks, tracks branching from the single receiving track to the several destination tracks, switches at the junctions of the tracks, means on each type for controlling each switch independently of the others and causing the type to travel on a definite track at each branch to carry it to its proper destination track, and type moving means for moving the respective type along the tracks from the receiving track to the destination tracks.

6. A single receiving track, a series of destination tracks, tracks branching from the receiving track to the destination tracks, switches at the junctions between the branch tracks, independent electrical devices for the respective switches for operating said switches independently of each other, circuits for the respective electrical switch operating devices, and means on the respective type for coöperating at each switch with the electrical device for controlling said switch.

7. A single receiving track, a series of destination tracks, tracks branching from the receiving track to the several destination tracks, switches at the junctions of the branching tracks, an electrical device at each switch for operating said switch, a circuit controller at each switch for the adjacent electrical device, said circuit controllers being located at various elevations, each type being provided with a switch controlling face with configurations at various elevations to coöperate at each switch with a circuit controller of corresponding elevation.

8. A single receiving track, a plurality of destination tracks, tracks branching from the receiving track to the destination tracks, switches at the junctions of the branching tracks, a solenoid with an armature connected to each switch, a circuit for each solenoid, a contact blade at each switch for closing each circuit, each type having a switch controlling face with configurations for pressing or missing the contact blade at each switch which it encounters.

9. A single receiving track, a plurality of destination tracks, tracks branching from the receiving track to the destination tracks, switches at the junctions of the branching tracks, a solenoid at each switch with an armature connected to each switch, a contact blade at each switch for controlling the circuit through each solenoid, said contact blades being arranged at various elevations, each type having a switch controlling face with configurations at various elevations for coöperating with contact blades of corresponding elevations.

10. A single receiving track, a plurality of destination tracks, tracks branching from the receiving track to the destination tracks, switches at the junctions of the branch tracks a series of rods extending transversely to the tracks, an endless carrier for moving said rods along said tracks, fingers slidable longitudinally of said rods and projecting into said tracks for pushing type along the tracks, and means for causing each type to control the position of each switch which it encounters in passing from the receiving track to its destination track.

11. A single receiving track, a plurality of destination tracks, tracks branching from the receiving track to the destination tracks, switches at the junctions of the branch tracks a series of rods extending transversely to the tracks, an endless carrier for moving said rods along said tracks, fingers slidable longitudinally of said rods and projecting into said tracks for pushing type along the tracks, means for causing each type to control the position of each switch which it encounters in passing from the receiving track to its destination track, walls converging toward a single point to restore said fingers to a central position on the rods during the backward travel of the fingers to cause the fingers to enter the single receiving track.

12. A series of destination tracks, a single receiving track, tracks branching from the receiving track to the several destination tracks and adapted to receive and guide type, means for causing each type to pass onto a definite track at the junctions of the branching tracks, a type holder provided with a series of parallel type holding means for holding type in rows, a follower traveling longitudinally of said type holder, a finger operated by the follower for pushing type in a row out of said type holder, means for automatically returning said follower and type pushing finger to the starting point after it has ejected the type of a row, means for automatically moving the type holder transversely to bring another row of type into ejecting position, and means for automatically causing the follower and its finger to commence its ejecting movement after the type holder has been thus moved.

13. A series of destination tracks, a single receiving track, tracks branching from the receiving track to the several destination tracks and adapted to receive and guide type, means for causing each type to pass onto a definite track at the junctions of the branching tracks, a type holder provided with a series of parallel type holding means for holding type in rows, a follower traveling longitudinally of said type holder, a finger operated by the follower for pushing type in a row out of said type holder, means for automatically returning said follower and type pushing finger to the starting point after it has ejected the type of a row, means for automatically moving the type holder transversely to bring another row of type into ejecting position, means for automatically causing the follower and its finger to commence its ejecting movement after the type holder has been thus moved, a chute for receiving type ejected from the row in the type holder, and a plunger at the bottom of said chute for moving a type from the bottom of the chute into the single receiving track.

14. A series of destination tracks, a single receiving track, tracks branching from the receiving track to the several destination tracks and adapted to receive and guide type, means for causing each type to pass onto a definite track at the junctions of the branching tracks, a type holder provided with a series of parallel type holding means for holding type in rows, a follower traveling longitudinally of said type holder, a finger operated by the follower for pushing type in a row out of said type holder, means for automatically returning said follower and type pushing finger to the starting point after it has ejected the type of a row, means for automatically moving the type holder transversely to bring another row of type into ejecting position, means for automatically causing the follower and its finger to commence its ejecting movement after the type holder has been thus moved, a chute for receiving type ejected from the row in the type holder, a plunger at the bottom of said chute for moving a type from the bottom of the chute into the single receiving track, electrical means for operating said plunger, and a lever at the bottom of said chute operated by the falling type for closing the circuit through said electrical means.

15. A single receiving track, a plurality of destination tracks, tracks branching from the receiving track to the destination tracks, and adapted to receive and guide type, means on each type for causing it to enter a definite track at each junction of branching tracks which it encounters, a type holder provided with a series of parallel type holding means, a follower with a finger operable longitudinally of said type holder for pushing type of a row out of the type holder, a ratchet, means operated by said ratchet for moving the type holder to bring a definite row of type into ejecting position under said carrier, and means operated by said follower at the finish of its travel for actuating said ratchet.

16. A single receiving track, a plurality of destination tracks, tracks branching from the receiving track to the destination tracks and adapted to receive and guide type, means on each type for causing it to enter a definite track at each junction of branching tracks which it encounters, a type holder provided with a series of parallel type holding means, a follower with a finger operable longitudinally of said type holder for pushing type of a row out of the type holder, a ratchet, means operated by said ratchet for moving the type holder to bring a definite row of type into ejecting position under said follower, a pawl engaging the ratchet, a rod carrying said pawl, an arm on said rod, a cam on said follower, a screw for operating said follower, and means for tilting said follower at the end of its ejecting travel to cause the cam to operate said arm and lift said rod to actuate the said pawl.

17. A single receiving track, a plurality of destination tracks, tracks branching from the receiving track to the destination tracks and adapted to receive and guide type, means on each type for causing it to enter a definite track at each junction of branching tracks which it encounters, a type holder provided with a series of parallel type holding means, a follower with a finger operable longitudinally of said type holder for pushing type of a row out of the type holder, a ratchet, means operated by said ratchet for moving the type holder to bring a definite row of type into ejecting position under said follower, a pawl engaging the ratchet, a rod carrying said pawl, an arm on said rod, a cam on said follower, a screw for operating said carrier, means for tilting said follower at the end of its ejecting travel to cause the cam to operate said arm and lift said rod to actuate the said pawl, an adjustable arm on said carrier adapted to engage said screw, and a supporting rod extending along the screw and adapted to support the said adjustable arm during its return travel and hold it out of engagement with the screw, the said supporting rod having a loop at each end thereof to permit said adjustable arm to move into or out of engagement with the screw.

18. A single receiving track, a plurality of destination tracks, tracks branching from the receiving track to the destination tracks and adapted to receive and guide type, means on each type for causing it to enter a definite track at each junction of branching tracks which it encounters, a type holder provided with a series of parallel type holding means, a follower with a finger operable longitudinally of said type holder for pushing type of a row out of the type holder, a ratchet, means operated by said ratchet for moving the type holder to bring a definite row of type into ejecting position under said follower, a pawl engaging the ratchet, a rod carrying said pawl, an arm on said rod, a cam on said carrier, a screw for operating said follower, means for tilting said follower at the end of its ejecting travel to cause the cam to operate said arm and lift said rod to actuate the said pawl, an adjustable arm on said carrier adapted to engage said screw, a supporting rod extending along the screw and adapted to support the said adjustable arm during its return travel and hold it out of engagement with the screw, the said supporting rod having a loop at each end thereof to permit said adjustable arm to move into or out of engagement with the screw, a flexible connection secured to the type holder, a weight attached to the connection for exerting a constant rearward pull on the type holder, and a retaining pawl engaging the ratchet for preventing rearward movement of the type holder.

In testimony whereof, I have hereunto set my hand at Los Angeles, California, this 23d day of March 1911.

WILLIAM J. POOLE.

In presence of—
G. T. HACKLEY,
FRANK L. A. GRAHAM.